(12) United States Patent
Obara et al.

(10) Patent No.: US 11,287,273 B2
(45) Date of Patent: Mar. 29, 2022

(54) PATROL SYSTEM AND SERVER FOR PATROL SYSTEM

(71) Applicant: TOYOTA JIDOSHA KABUSHIKI KAISHA, Aichi-ken (JP)

(72) Inventors: Ryohei Obara, Nagakute (JP); Masaki Ito, Toyota (JP); Makoto Kakuchi, Toyota (JP); Mutsumi Matsuura, Okazaki (JP); Hiroaki Sugiyama, Nagoya (JP); Yuichi Tashiro, Owariasahi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 272 days.

(21) Appl. No.: 16/572,608

(22) Filed: Sep. 17, 2019

(65) Prior Publication Data

US 2020/0141743 A1 May 7, 2020

(30) Foreign Application Priority Data

Nov. 1, 2018 (JP) .............................. JP2018-206359

(51) Int. Cl.
*G01C 21/34* (2006.01)
*G07C 1/20* (2006.01)
*G08G 1/13* (2006.01)
*G05D 1/02* (2020.01)
*G05D 1/00* (2006.01)

(52) U.S. Cl.
CPC ....... *G01C 21/3461* (2013.01); *G05D 1/0088* (2013.01); *G05D 1/0214* (2013.01); *G07C 1/20* (2013.01); *G08G 1/13* (2013.01); *G05D 2201/0213* (2013.01)

(58) Field of Classification Search
CPC ............. G01C 21/3461; G05D 1/0088; G05D 1/0214; G05D 2201/0213; G07C 1/20; G08G 1/13
USPC ......................................................... 701/25
See application file for complete search history.

(56) References Cited

U.S. PATENT DOCUMENTS 10,698,421 B1 * 6/2020 Harris ..................... H04W 4/40

FOREIGN PATENT DOCUMENTS

JP 2015-179333 A 10/2015

* cited by examiner

*Primary Examiner* — Gertrude Arthur Jeanglaude
(74) *Attorney, Agent, or Firm* — Hauptman Ham, LLP

(57) ABSTRACT

A patrol system includes a vehicle and a server. The server includes: a first decision unit that decides a priority of each of a plurality of patrol points to be patrolled and located in a prescribed area, based on resident data including data of the number of residents living in the prescribed area and addresses of the residents; a second decision unit that decides a patrol route for patrolling the patrol points, based on map information of the prescribed area and the priorities; and a transmission unit that transmits the patrol route to the vehicle.

11 Claims, 6 Drawing Sheets

PATROL SYSTEM AND SERVER FOR PATROL SYSTEM

INCORPORATION BY REFERENCE

The disclosure of Japanese Patent Application No. 2018-206359 filed on Nov. 1, 2018 including the specification, drawings and abstract is incorporated herein by reference in its entirety.

BACKGROUND

1. Technical Field

The disclosure relates to a patrol system and a server for the patrol system.

2. Description of Related Art

In recent years, population decline is proceeding in regional cities and there are areas with low population densities, such as underpopulated areas. In areas with low population densities, police officers and volunteers may not be able to patrol the entire area.

Japanese Patent Application Publication No. 2015-179333 (JP 2015-179333 A) describes an area monitoring system that includes a management device and a plurality of mobile bodies each electrically driven in accordance with commands from the management device. With the mobile bodies, the area monitoring system collects image information acquired by taking images of the surrounding conditions. With the management device, the area monitoring system: calculates an imaging frequency of each road section based on the image information received from the mobile bodies; identifies a road section in which the imaging frequency is less than a prescribed value; and dispatches the mobile bodies that is positioned near the identified road section, that has a remaining battery capacity that is equal to or more than a prescribed value, and that is not operating.

SUMMARY

With the technique described in JP 2015-179333 A, it is possible to reduce the difference in imaging frequencies among the sections and perform area monitoring. However, in areas with low population densities, residences etc. are scattered and there is a possibility that the efficiency of patrolling will not be increased if the entire area is patrolled equally.

The disclosure provides a patrol system and a server for the patrol system that make it possible to perform patrol efficiently even when places that should be focused in patrolling are scattered.

A patrol system according to a first aspect of the disclosure includes a vehicle and a server. The server includes: a first decision configured to decide a priority of each of a plurality of patrol points to be patrolled and located in a prescribed area, based on resident data including data of the number of residents living in the prescribed area and addresses of the residents; a second decision unit configured to decide a patrol route for patrolling the patrol points, based on map information of the prescribed area and the priorities; and a transmission unit configured to transmit the patrol route to the vehicle.

In the aspect, the priority of each of the patrol points to be patrolled and located in the prescribed area is decided and the patrol route is decided based on the priorities. It is thus possible to perform patrol efficiently even when places that should be focused in patrolling are scattered.

In the aspect, the vehicle may include a camera that takes an image of surroundings around the vehicle and a transmission unit configured to transmit the image taken by the camera to the server.

With this configuration, it is possible to provide the image of the patrol route to a user via the server, and accumulate the image in the server.

In the aspect, the server may further include a determination unit configured to determine whether there is an abnormality, based on a plurality of the images of the same patrol point taken at different times.

With this configuration, it is possible to determine whether there is an abnormality at the patrol points and send an alert to the user when there is an abnormality.

In the aspect, the resident data may include data of a family structure and an age range of the residents.

With this configuration, it is possible to perform patrol prioritizing the residence of a person living on his/her own or the residence of an elderly person by using data of the family structure and the age range of the residents.

In the aspect, the first decision unit may be configured to decide the priority of each of the plurality of patrol points based on the resident data and crime history data of a crime that occurred or is suspected to have occurred in the prescribed area.

With this configuration, it is possible to decide the patrol route so as to perform patrol while prioritizing places in which there is a high probability that a crime will reoccur.

In the aspect, the second decision unit may be configured to divide a prescribed period into a plurality of periods and decide the patrol route for each period such that the patrol points are patrolled at least once within the prescribed period.

With this configuration, it is possible to schedule the patrol for each period so as to patrol the patrol points at least once within the prescribed period, even when the patrol points are scattered over a wide range and it is difficult to patrol the patrol points at once.

The patrol system of the aspect may further include a plurality of the vehicles and the second decision unit may be configured to decide the patrol route for patrolling the patrol points for each of the vehicles.

With this configuration, it is possible to decide a plurality of the patrol routes so as to perform patrol over a wide range with the vehicles.

In the aspect described above, the vehicle may travel along the patrol route by autonomous driving.

With this configuration, it is possible for the vehicles to travel autonomously along the patrol route to patrol the patrol points.

A second aspect of the disclosure relates to a server for a patrol system. The server includes: a first decision unit configured to decide a priority of each of a plurality of patrol points to be patrolled and located in a prescribed area, based on resident data including data of the number of residents living in the prescribed area and addresses of the residents; a second decision unit configured to decide a patrol route for patrolling the patrol points, based on map information of the prescribed area and the priorities; and a transmission unit configured to transmit the patrol route to a vehicle.

In the aspect, the server may further include a determination unit configured to determine whether there is an abnormality, based on a plurality of images of the same patrol point taken at different times.

With the configuration, it is possible to provide a patrol system and a server that enable efficient patrol even when places that should be predominantly patrolled are scattered.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
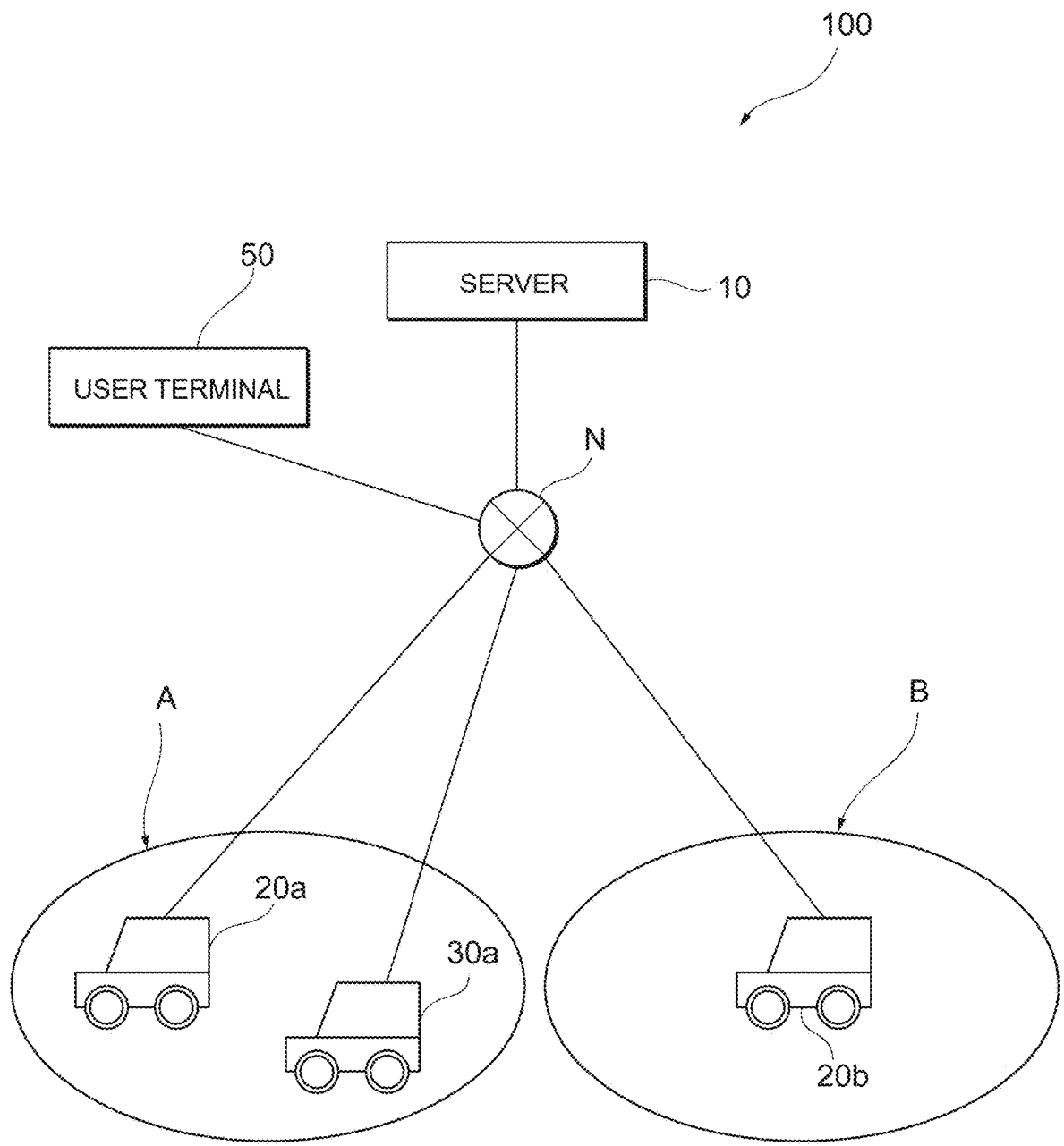
FIG. 1 illustrates a network configuration of a patrol system according to an embodiment.

An embodiment will be described with reference to the attached drawings. In the drawings, elements with the same reference signs have the same or similar configurations.

FIG. 1 illustrates a network configuration of a patrol system 100 according to the embodiment. The patrol system 100 includes a server 10, a first vehicle 20a, a second vehicle 30a, and a third vehicle 20b. The server 10 and the first vehicle 20a, the server 10 and the second vehicle 30a, the server 10 and the third vehicle 20b are able to communicate with each other via a communication network N. The communication network N is a wireless communication network, such as the Internet.

In the embodiment, the case in which the first vehicle 20a and the second vehicle 30a are placed in a first area A and the third vehicle 20b is placed in a second area B will be described. The first area A and the second area B may be areas of any size and of any population density, and may be an underpopulated area, for example. The first area A and the second area B may be areas in which residences are scattered, for example.

The first vehicle 20a, the second vehicle 30a, and the third vehicle 20b may be any vehicle, and may be an electric ultra-compact mobility vehicle which one or two people can ride. The first vehicle 20a, the second vehicle 30a, and the third vehicle 20b may travel along a patrol route described below by autonomous driving. It is thus possible for the vehicles to travel autonomously along the patrol route to patrol a plurality of patrol points. In the first vehicle 20a, the second vehicle 30a, and the third vehicle 20b, a route received from the server 10 may be displayed on a display of a car navigation device so that a driver drives along the route.

When an alert is issued by the server 10 based on images of the first area A and the second area B taken by the first vehicle 20a, the second vehicle 30a, and the third vehicle 20b, a user terminal 50 receives the alert and the images. The user terminal 50 may be a computer that is used by a manager or a person in charge of security in the first area A and the second area B. The user terminal 50 may be a desktop computer, a laptop computer, a tablet terminal, or a smartphone.

Figure 2:
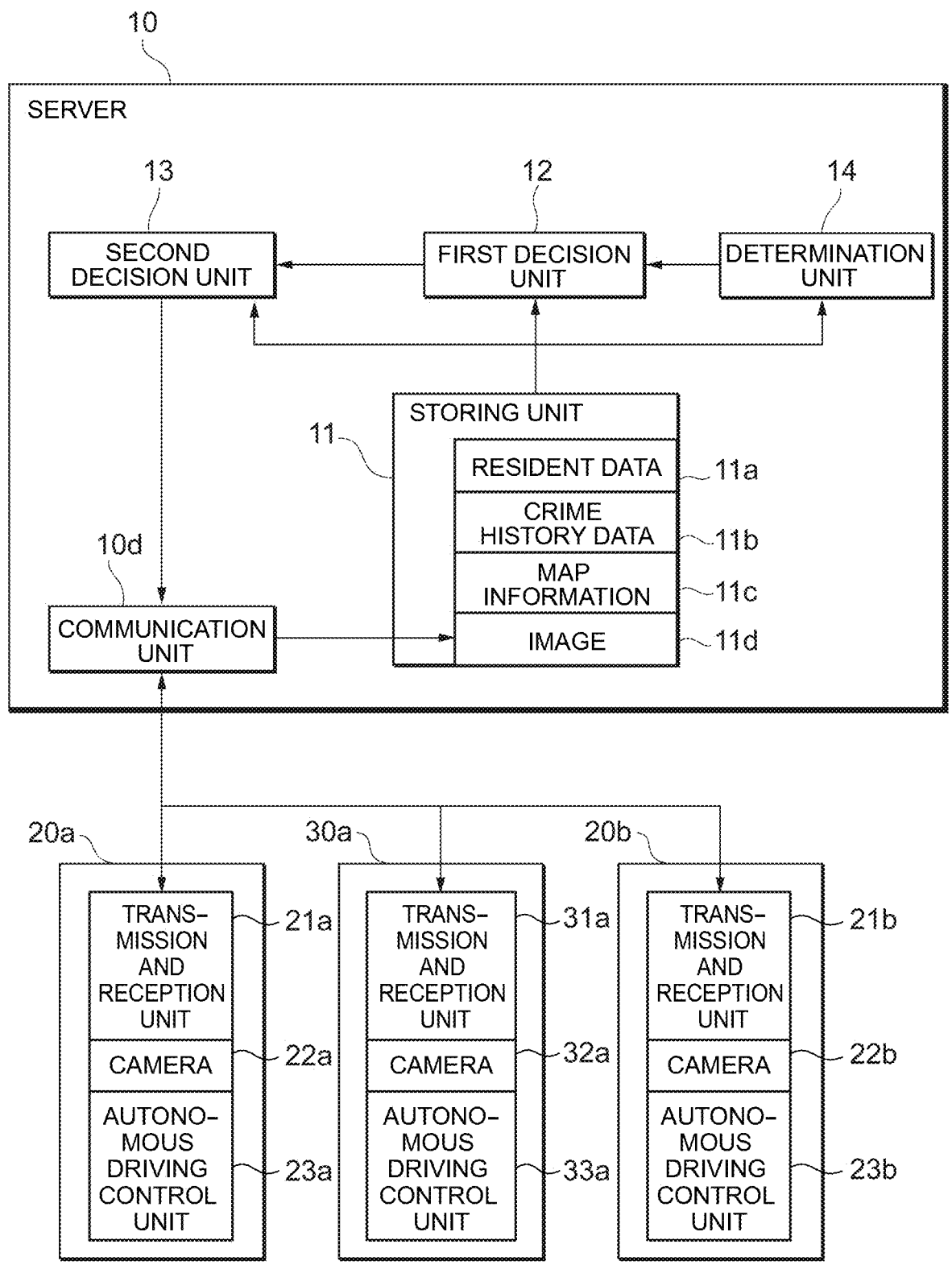
FIG. 2 illustrates function blocks of the patrol system according to the embodiment.

FIG. 2 illustrates function blocks of the patrol system 100 according to the embodiment. The patrol system 100 includes the server 10, the first vehicle 20a, the second vehicle 30a, and the third vehicle 20b. The server 10 includes a storing unit 11, a first decision unit 12, a second decision unit 13, a determination unit 14, and a communication unit 10d.

The storing unit 11 stores resident data 11a, crime history data 11b, map information 11c, and images 11d. The resident data 11a includes data of the number and addresses of residents living in a prescribed area. The resident data 11a may include data of a family structure and an age range of the residents. It is possible to perform patrol prioritizing the residence of a person living on his/her own or the residence of an elderly person by using data of the family structure and the age range of the residents.

The crime history data 11b includes data of the type, the location of occurrence, and the day and time of occurrence of a crime that occurred or is suspected to have occurred in the prescribed area. The map information 11c includes information of a road map of the prescribed area, and may include information of the residences of the prescribed area. The images 11d are images that are taken by the first vehicle 20a, the second vehicle 30a, and the third vehicle 20b, and may be images of the patrol points included in the first area A and the second area B.

The first decision unit 12 decides a priority of each of the patrol points to be patrolled and located in the prescribed area, based on the resident data 11a. In the case of the embodiment, the first decision unit 12 may decide a priority of each of the patrol points located in the first area A and a priority of each of the patrol points located in the second area B independently from each other.

The first decision unit 12 may decide the priority of each of the patrol points, based on the resident data 11a and the crime history data 11b. It is possible to decide the patrol route so as to perform patrol while prioritizing places in each of which there is a high probability that a crime will reoccur, by taking the crime history data 11b into consideration.

The second decision unit 13 decides the patrol route for patrolling the patrol points based on the map information 11c and the priorities in the prescribed area. The second decision unit 13 may decide the patrol route such that the patrol points are patrolled in order of priority within a predetermined amount of time.

The second decision unit 13 may divide a prescribed period into a plurality of periods and decide the patrol route for each period such that the patrol points are patrolled at least once within the prescribed period. For example, when the prescribed period is a week, the second decision unit 13 may divide the prescribed period into seven days and decide a patrol route for each day. It is thus possible to schedule the patrol for each period so as to patrol the patrol points at least once within the prescribed period, even when the patrol points are scattered over a wide range and it is difficult to patrol the patrol points at once.

The patrol system 100 of the embodiment includes the vehicles (the first vehicle 20a, the second vehicle 30a, and the third vehicle 20b). In this case, the second decision unit 13 may decide the patrol route for patrolling the patrol points for each of the vehicles. That is, the second decision unit 13 may decide the patrol route for each of the first vehicle 20a, the second vehicle 30a, and the third vehicle 20b. In this way, it is possible to decide a plurality of the patrol routes so that it is possible to perform patrol over a wide range with the vehicles.

The communication unit 10d transmits the patrol route to the first vehicle 20a, the second vehicle 30a, and the third vehicle 20b. The communication unit 10d receives the images taken by the first vehicle 20a, the second vehicle 30a, and the third vehicle 20b from the first vehicle 20a, the second vehicle 30a, and the third vehicle 20b. The communication unit 10d is an example of a transmission unit.

With the patrol system 100 of the embodiment, the priority of each of the patrol points to be patrolled and located in the prescribed area is decided and the patrol route is decided based on the priorities. Thus, it is possible to perform patrol efficiently even when the places that should be focus in patrolling are scattered.

The determination unit 14 determines whether there is an abnormality based on images of the same patrol point taken at different times. Here, an abnormality may include an event in which an accident is suspected to have occurred, or an event in which rescue should be requested, in addition to an event in which a crime has occurred or is suspected to have occurred. With the determination unit 14, it is possible to determine whether there is an abnormality at the patrol points and send an alert to a user when there is an abnormality. The alert may be transmitted to the user terminal 50.

The first vehicle 20a has a transmission and reception unit 21a, a camera 22a, and an autonomous driving control unit 23a. The second vehicle 30a has a transmission and reception unit 31a, a camera 32a, and an autonomous driving control unit 33a. The third vehicle 20b has a transmission and reception unit 21b, a camera 22b, and an autonomous driving control unit 23b. Functions of the transmission and reception unit 31a, the camera 32a and the autonomous driving control unit 33a, and functions of the transmission and reception unit 21b, the camera 22b, and the autonomous driving control unit 23b are the same as the functions of the transmission and reception unit 21a, the camera 22a, and the autonomous driving control unit 23a, respectively. Hereinafter, the transmission and reception unit 21a, the camera 22a, and the autonomous driving control unit 23a will thus be described.

The transmission and reception unit 21a receives information of the patrol route from the server 10. The transmission and reception unit 21a transmits the images taken by the camera 22a to the server 10.

The camera 22a may be a digital camera that takes a color image, and the camera 22a takes images of the surroundings of the first vehicle 20a. A plurality of the cameras 22a may be provided. The camera 22a may also take a video. Since the camera 22a is provided in the first vehicle 20a, it is possible to provide the images of the patrol route to the user terminal 50 via the server 10, and accumulate the images in the server 10.

The autonomous driving control unit 23a controls the first vehicle 20a so that the first vehicle 20a travels autonomously along a set route. The first vehicle 20a may have a sensor (not shown) that is necessary for autonomous driving.

Figure 3:
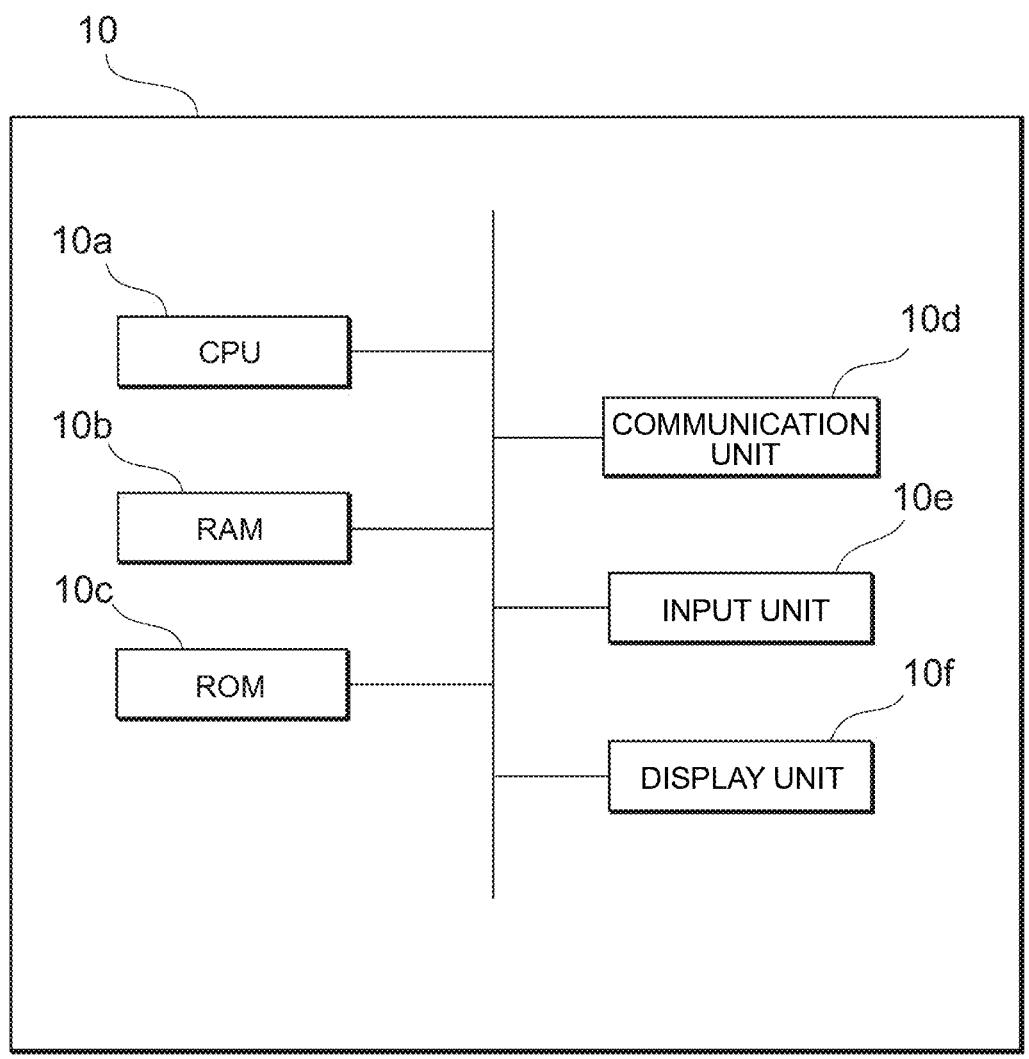
FIG. 3 illustrates a physical configuration of a server according to the embodiment.

FIG. 3 illustrates a physical configuration of a server 10 according to the embodiment. The server 10 includes a central processing unit (CPU) 10a, a random access memory (RAM) 10b, a read-only memory (ROM) 10c, the communication unit 10d, an input unit 10e, and a display unit 10f. The components are connected via a bus so as to be able to transmit and receive data to and from each other. In the embodiment, the case in which the server 10 is composed of one computer will be described. However, the server 10 may include a plurality of computers.

The CPU 10a is a control unit that performs control of the execution of a program stored in the RAM 10b or the ROM 10c and that performs calculation and processing of data. The CPU 10a is a calculation device that executes a program (patrol program) that decides the patrol route for patrolling the patrol points with the vehicle. The CPU 10a receives various input data from the input unit 10e and the communication unit 10d, and displays the calculation result of the input data on the display unit 10f or stores the calculation result of the input data in the RAM 10b or the ROM 10c.

The date stored in the RAM 10b is rewritable. The RAM 10b may be formed of semiconductor storage elements, for example. The RAM 10b stores the patrol program executed by the CPU 10a and data such as the resident data 11a, the crime history data 11b, the map information 11c, and the images 11d.

The date stored in the ROM 10c is readable. The ROM 10c may be formed of semiconductor storage elements, for example. The ROM 10c stores the patrol program or non-rewritable data.

The communication unit 10d is an interface that connects the server 10 to an outside device. The communication unit 10d may be connected to the first vehicle 20a, the second vehicle 30a, and the third vehicle 20b via the Internet, for example, and may receive images from the first vehicle 20a, the second vehicle 30a, and the third vehicle 20b. The communication unit 10d may download the resident data 11a, the crime history data 11b, and the map information 11c via the Internet.

The input unit 10e receives input of data from the user. The input unit 10e may include a keyboard, a mouse, or a touch panel.

The display unit 10f visually displays the calculation result of the CPU 10a. The display unit 10f may be formed of a liquid crystal display (LCD), for example.

The patrol program may be provided in a state of being stored in a storage medium such as the RAM 10b and the ROM 10c that are able to be read by a computer, or may be provided via a communication network connected by the communication unit 10d. In the server 10, the CPU 10a executes the patrol program so as to implement the operations of the first decision unit 12, the second decision unit 13, and the determination unit 14 that are described with reference to FIG. 2. The physical configurations are exemplary and do not necessarily have to be independent configurations. For example, the server 10 may have a large-scale integration (LSI) in which the CPU 10a, the RAM 10b, and the ROM 10c are integrated.

Figure 4:
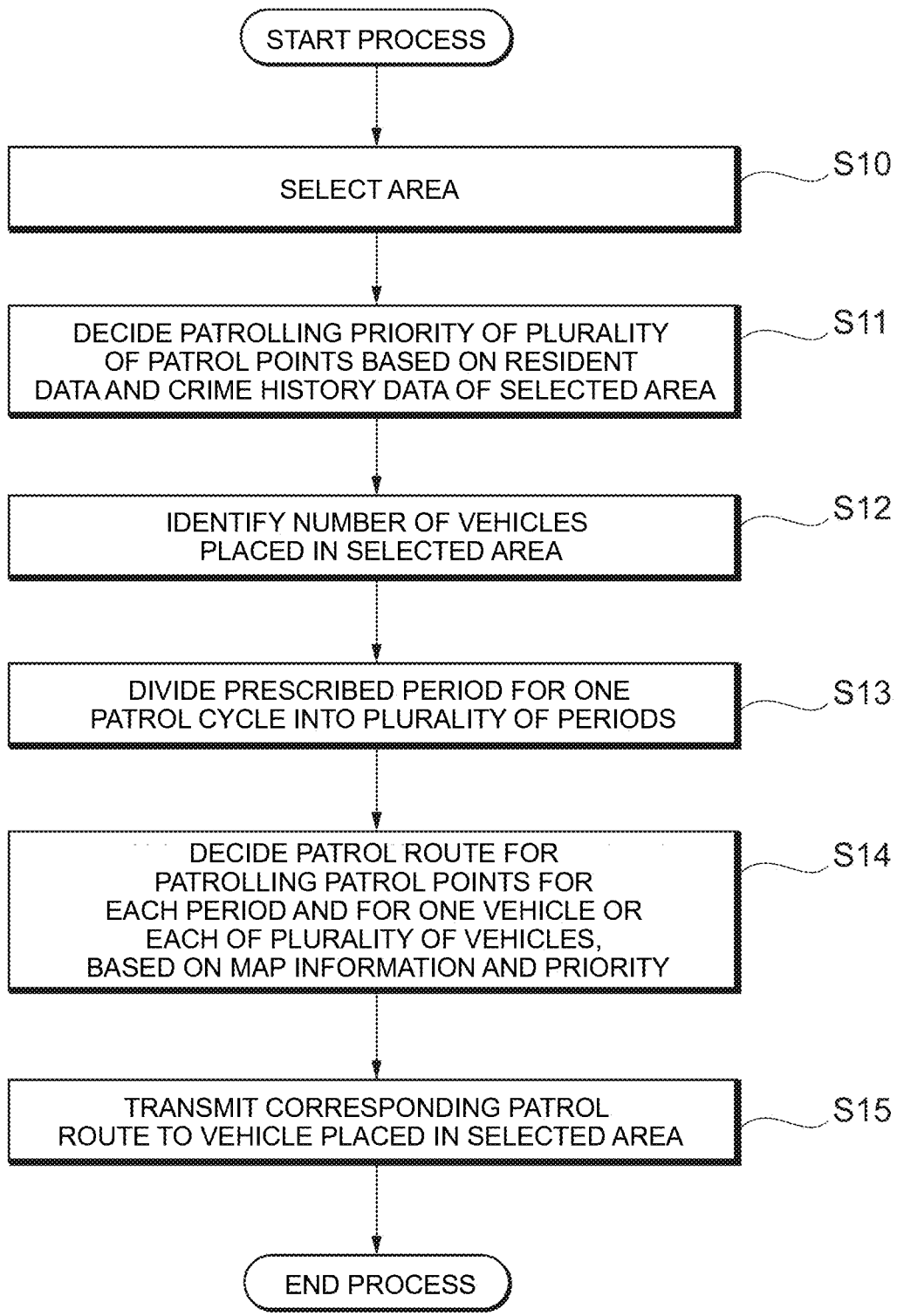
FIG. 4 is a flowchart of a patrol route decision process that is executed by the server according to the embodiment.

FIG. 4 is a flowchart of a patrol route decision process that is executed by the server 10 according to the embodiment. The server 10 first selects the area in which the patrol route is to be set (S10). The area may be selected based on the input from the user.

The server 10 decides the priority of each of the patrol points based on the resident data 11a and the crime history data 11b of the selected area (S11). The server 10 then identifies the number of vehicles that are placed in the selected area (S12).

The server 10 divides the prescribed period for one patrol cycle into a plurality of periods (S13). The server 10 decides the patrol route for patrolling the patrol points for each period and for one vehicle or each of the plurality of vehicles based on the map information 11c and the priorities (S14).

The server 10 transmits the corresponding patrol route to the one or more vehicles placed in the selected area (S15). Thus, the patrol route decision process ends.

Figure 5:
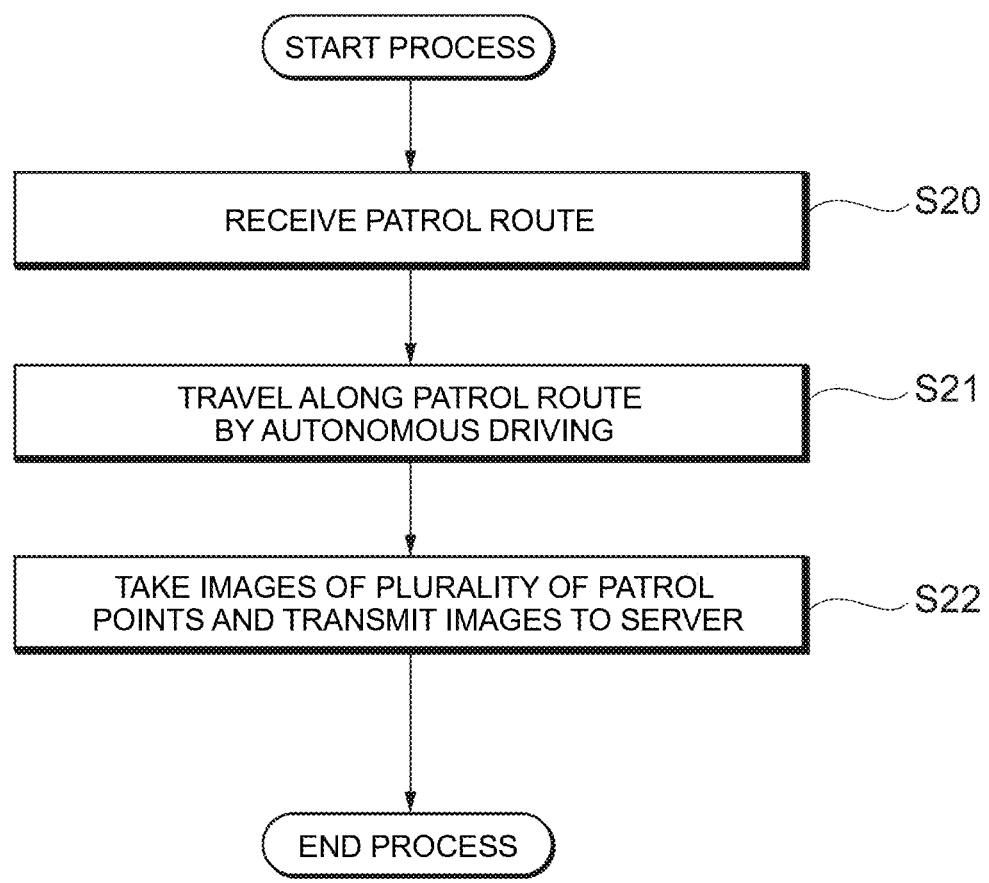
FIG. 5 is a flowchart of a patrol processing that is executed by a vehicle according to the embodiment.

FIG. 5 is a flowchart of a patrol process that is executed by a vehicle according to the embodiment. The vehicle first receives the patrol route from the server 10 (S20).

The vehicle then travels along the patrol route by autonomous driving (S21). The vehicle takes images of the patrol points and transmits the images to the server 10 (S22). Thus, the patrol process ends.

Figure 6:
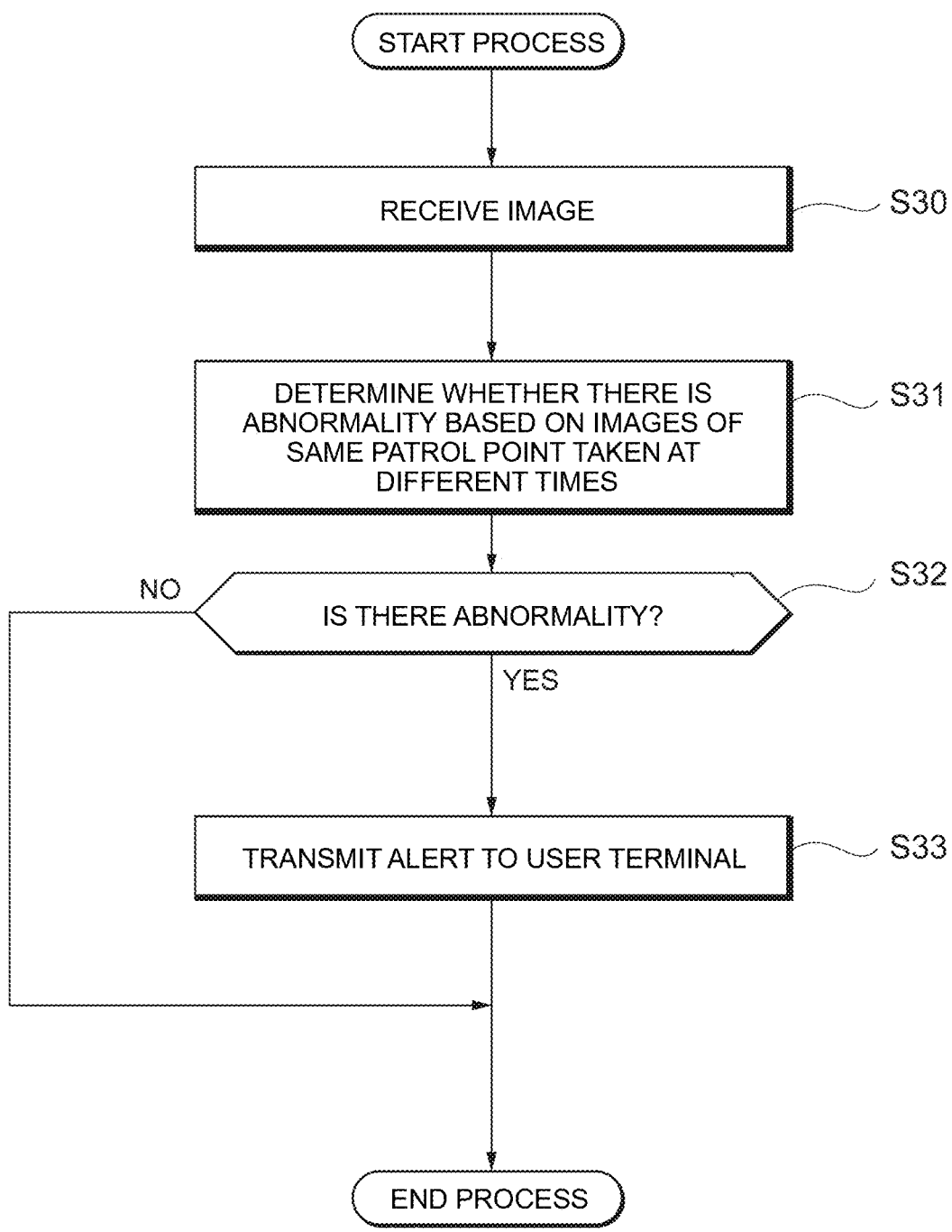
FIG. 6 is a flowchart of an abnormality determination process that is executed by the server according to the embodiment.

FIG. 6 is a flowchart of an abnormality determination process that is executed by the server according to the embodiment. The server 10 first receives images of the patrol points from one or more vehicles (S30) and saves the images in the storing unit 11.

The server 10 then determines whether there is an abnormality based on the images of the same patrol point, which are taken at different times (S31). When it is determined that there is an abnormality based on the images (S32: YES), the server 10 transmits an alert to the user terminal 50. The server 10 may transmit the images that are the basis of the determination to the user terminal 50 with the alert.

In contrast, when it is determined that there is no abnormality based on the images (S32: NO), the server 10 does not execute a particular process. Thus, the abnormality determination process ends.

The embodiment described above is for facilitating the understanding of the disclosure, and is not for limited interpretation of the disclosure. The components of the embodiment as well as the placement, the materials, the conditions, the shapes, the sizes etc. of the components are not limited to the examples and may be changed as needed. In addition, the components of the different embodiments may be partially replaced with each other or combined with each other.

What is claimed is:

1. A patrol system comprising:
   a vehicle; and
   a server including: a first decision unit configured to decide a priority of each of a plurality of patrol points to be patrolled and located in a prescribed area, based on resident data including data of the number of residents living in the prescribed area and addresses of the residents; a second decision unit configured to decide a patrol route for patrolling the patrol points, based on map information of the prescribed area and the priorities; and a transmission unit configured to transmit the patrol route to the vehicle.

2. The patrol system according to claim 1, wherein the vehicle includes:
   a camera configured to take an image of surroundings of the vehicle, and
   a transmission unit configured to transmit the image taken by the camera to the server.

3. The patrol system according to claim 2, wherein the server further includes a determination unit configured to determine whether there is an abnormality, based on a plurality of the images of the same patrol point taken at different times.

4. The patrol system according to claim 1, wherein the resident data includes data of a family structure and an age range of the residents.

5. The patrol system according to claim 1, wherein the first decision unit is configured to decide the priority of each of the plurality of patrol points based on the resident data and crime history data of a crime that occurred or is suspected to have occurred in the prescribed area.

6. The patrol system according to claim 1, wherein the second decision unit is configured to:
   divide a prescribed period into a plurality of periods, and
   decide the patrol route for each period such that each of the patrol points is patrolled at least once within the prescribed period.

7. The patrol system according to claim 1, further comprising:
   a plurality of the vehicles, wherein
   the second decision unit is configured to decide the patrol route for patrolling the patrol points for each of the vehicles.

8. The patrol system according to claim 1, wherein the vehicle is configured to travel along the patrol route by autonomous driving.

9. The patrol system according to claim 1, wherein the second decision unit is configured to decide the patrol route to instruct the vehicle to patrol the patrol points in order of the priorities of the patrol points within a predetermined amount of time.

10. A server for a patrol system, the server comprising:
    a first decision unit configured to decide a priority of each of a plurality of patrol points to be patrolled and located in a prescribed area, based on resident data including data of the number of residents living in the prescribed area and addresses of the residents;
    a second decision unit configured to decide a patrol route for patrolling the patrol points, based on map information of the prescribed area and the priorities; and
    a transmission unit configured to transmit the patrol route to a vehicle.

11. The server according to claim 10, further comprising:
    a determination unit configured to determine whether there is an abnormality, based on a plurality of images of the same patrol point taken at different times.

* * * * *